United States Patent [19]
Dietrich

[11] Patent Number: 4,823,904

[45] Date of Patent: Apr. 25, 1989

[54] INSTALLATION FOR SLIPPAGE LIMITATION, RESPECTIVELY, PREVENTION OF DRIVEN WHEELS OF A MOTOR VEHICLE

[75] Inventor: Christian Dietrich, Wessling, Fed. Rep. of Germany

[73] Assignee: Bayerische Motoren Werke Aktiengesellschaft, Munich, Fed. Rep. of Germany

[21] Appl. No.: 912,689

[22] Filed: Sep. 26, 1986

Related U.S. Application Data

[63] Continuation of Ser. No. 661,961, Oct. 17, 1984.

[30] Foreign Application Priority Data

Oct. 17, 1983 [DE] Fed. Rep. of Germany ....... 3337664

[51] Int. Cl.4 ............................................ B60K 28/10

[52] U.S. Cl. ...................................... 180/197; 74/513; 123/401; 180/335

[58] Field of Search ......................... 180/197, 76, 335; 123/400, 401, 319, 332, 342; 74/513

[56] References Cited

U.S. PATENT DOCUMENTS

| | | | |
|---|---|---|---|
| 3,776,355 | 12/1973 | Scherenberg | 180/197 |
| 3,802,528 | 4/1974 | Leiber | 180/197 |
| 3,844,371 | 10/1974 | Garcea | 180/197 |
| 3,947,073 | 3/1976 | Catteneo | 192/3R |
| 4,416,347 | 11/1983 | Bertling | 180/197 |
| 4,510,905 | 4/1985 | Leiber | 123/401 |
| 4,510,906 | 4/1985 | Klatt | 123/401 |

FOREIGN PATENT DOCUMENTS

| | | | |
|---|---|---|---|
| 2058819 | 5/1972 | Fed. Rep. of Germany | 180/197 |
| 2442511 | 6/1975 | Fed. Rep. of Germany . | |
| 2436982 | 2/1976 | Fed. Rep. of Germany . | |
| 2549870 | 5/1976 | Fed. Rep. of Germany . | |
| 2344863 | 2/1977 | Fed. Rep. of Germany . | |
| 2555429 | 6/1977 | Fed. Rep. of Germany . | |
| 2630071 | 1/1978 | Fed. Rep. of Germany . | |
| 3137161 | 3/1983 | Fed. Rep. of Germany . | |
| 3143666 | 5/1983 | Fed. Rep. of Germany | 180/197 |
| 3146738 | 6/1983 | Fed. Rep. of Germany . | |
| 2151885 | 4/1973 | France . | |
| 2243090 | 4/1975 | France . | |
| 167845 | 10/1983 | Japan | 180/197 |

*Primary Examiner*—Charles A. Marmor
*Assistant Examiner*—Everett G. Diederiks, Jr.
*Attorney, Agent, or Firm*—Barnes & Thornburg

[57] ABSTRACT

In an installation for the slippage limitation, respectively, prevention of driven wheels of a motor vehicle with an internal combustion engine controllable by an actuatable output adjusting member, an adjustable abutment for the output adjusting member serves for the purpose to so correct the driving torque of the internal combustion engine that the slippage is reduced to the permissive extent.

7 Claims, 1 Drawing Sheet

INSTALLATION FOR SLIPPAGE LIMITATION, RESPECTIVELY, PREVENTION OF DRIVEN WHEELS OF A MOTOR VEHICLE

This is a continuation of application Ser. No. 661,961, filed Oct. 17, 1984 abandoned.

The present invention relates to an installation for limitation of slippage, respectively, of driven wheels of a motor vehicle with an internal combustion engine controllable by a directly actuatable output adjusting member.

The driven wheels of a motor vehicle pass over into an undesired high slippage when the frictional connection between tires and road surface is smaller than the respectively effective acceleration moment. This case occurs both when "giving gas", i.e., with the output increase of the internal combustion engine, with the aid of an output adjusting member constructed, as a rule, as a so-called gas pedal, as also when "releasing the gas pedal", i.e., with the output reduction. It is known for the latter case (DE-OS 31 37 161) to open the throttle valve during the retraction of the output-adjusting member for the reduction of the brake moment of the internal combustion engine and therewith to achieve a free-wheeling effect; however, this requires an engagement into the transmission linkage between the output-adjusting member and the throttle valve.

The present invention is therefore concerned with the task to provide an installation of the aforementioned type which assures an effective slippage limitation, that is, prevention without engagement into the transmission path between the output-adjusting member and the control member determining the output of the internal combustion engine. The last-mentioned control member involves in the case of an Otto internal combustion engine as a rule the throttle valve whereas in the case of a diesel internal combustion engine it involves the adjusting lever of the injection pump.

The underlying problems are solved according to the present invention by an adjustable abutment for the output adjusting member, which adjusts the latter during the occurrence of an abnormal slippage from the preselected position into a position, in which the wheels possess the maximum permissive slippage.

As a result of the direct action of the abutment on the output-adjusting member, the driver personally receives the information concerning a possibly occurring non-permissive slippage of the driven wheels. Since the abutment indicates in each case the position in which the slippage just possesses the maximum permissive value, the driver is then able to adjust the power output of the internal combustion engine to the respective extreme possible value in every traffic situation. The motor vehicle can thus be operated always with the optimum forward thrust, respectively, with the optimum deceleration.

It is known to interact directly on the output-adjusting member. On the other hand, this takes place in order to warn the driver in case of a malfunctioning of the internal combustion engine of the motor vehicle (German Auslegeschrift No. 23 44 863 and German Offenlegungsschrift No. 25 55 429). On the other hand, this takes place for the purpose to maintain a preselected velocity to prevent exceeding the same (German Pat. No. 24 42 511 and German Offenlegungsschrift No. 26 30 071). In both cases, however, there is no connection whatsoever with the existing permissive driving deceleration moment of the internal combustion engine.

The constructive realization of the present invention may be obtained in different ways. In addition to a construction, known from the German Pat. No. 24 42 511, of an electrically adjustable abutment, the abutment may also be actuated hydraulically. This offers the advantage that relatively large forces can be transmitted onto the output adjusting member without trouble also during use over long periods of time. As with the known abutment, the output adjusting member may thereby be adjusted both in the direction of an output reduction as also of an output increase of the internal combustion engine. This is achieved, for example, with the aid of a double-acting cylinder connected force-lockingly with the output-adjusting member.

As also known from the German Pat. No. 24 42 511, the abutment may also be overridable. This can be achieved constructively, for example, with the aid of a springy or elastic mounting of the abutment, which permits overcoming the adjustment of the abutment by increased pressure.

These and other objects, features and advantages of the present invention will become more apparent from the following description when taken in connection with the accompanying drawing which shows, for purposes of illustration only, several embodiments in accordance with the present invention, and wherein.

Figure 1:
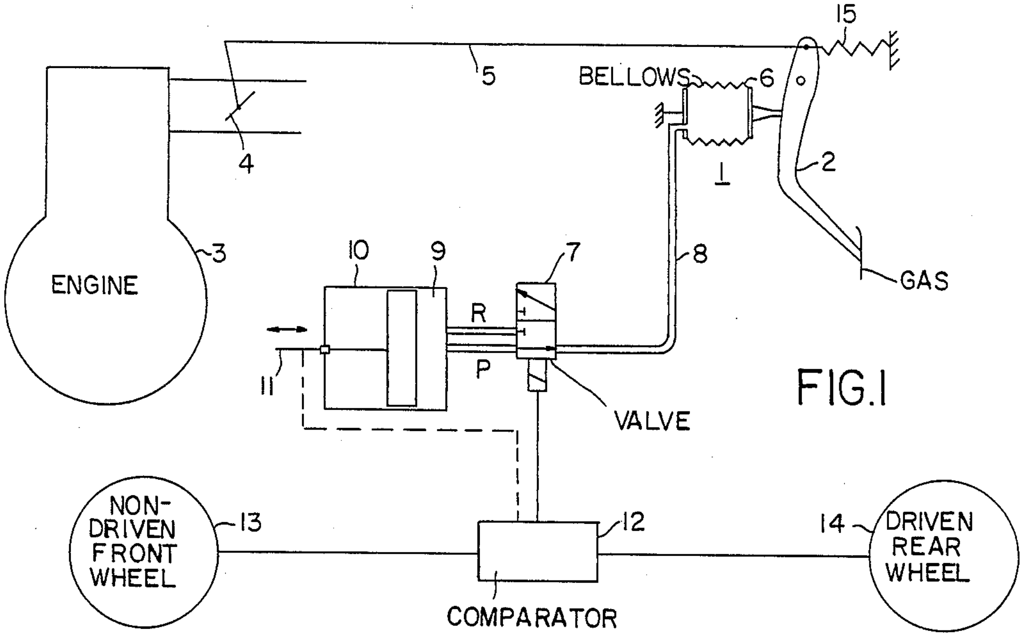
FIG. 1 is a schematic view of an installation for the limitation of slippage for the driven wheels of a motor vehicle in accordance with the present invention in the case of an excessive forward thrust.

Referring now to the drawing wherein like reference numerals are used throughout the various views to designate like parts, the installation illustrated in FIG. 1 includes as essential element an abutment 1 for the gas pedal 2 of a schematically indicated internal combustion engine 3 which includes a control member in the form of a throttle valve 4. A schematically indicated transmission linkage 5 converts the position of the gas pedal 2 serving as output-adjusting member into a corresponding position of the throttle valve 4.

The abutment 1 consists of a bellows 6 which is connected with a reservoir 9 for hydraulic oil by way of a valve 7 and a feed line 8. The reservoir 9 is component of a cylinder 10, in which a piston 11 is displaceable in both directions by a drive or actuation (not shown).

The control of the drive or actuation for the piston 11 and of the valve 7 takes place dependent on the slippage of the driven wheels of the motor vehicle. For that purpose, the rotational speed of a non-driven wheel 13, for example, at the front axle VA and of a driven wheel 14 at the rear axle HA is compared in a comparator 12 and with a predetermined rotational speed difference typical for a slippage, control signals are produced for the actuation of the piston 11 and of the valve 7.

If the driving torque of the internal combustion engine is excessive, then the piston 11 is moved toward the right in FIG. 1. The bellows 6 is filled by way of the valve 7 which is in the illustrated position, and adjusts the gas pedal 2 deflected against the force of a customary return spring 15 in the direction in which the throttle valve 4 effects an output reduction of the internal combustion engine 3. This adjustment takes place so far until the slippage lies under its limit value. The comparator device 12 then controls the valve into the other position and reverses the actuation of the piston 11 so that the bellows 6 now empties out under its own spring action and the piston 11 is displaced in the opposite direction.

The throttle valve can now be adjusted with the aid of the gas pedal 2 in the sense of an output increase of the internal combustion engine 3. If now an excessive slippage occurs again, then the operation described hereinabove is initiated anew and the gas pedal 2 is again adjusted back or retracted with the aid of the abutment 1.

Figure 2:
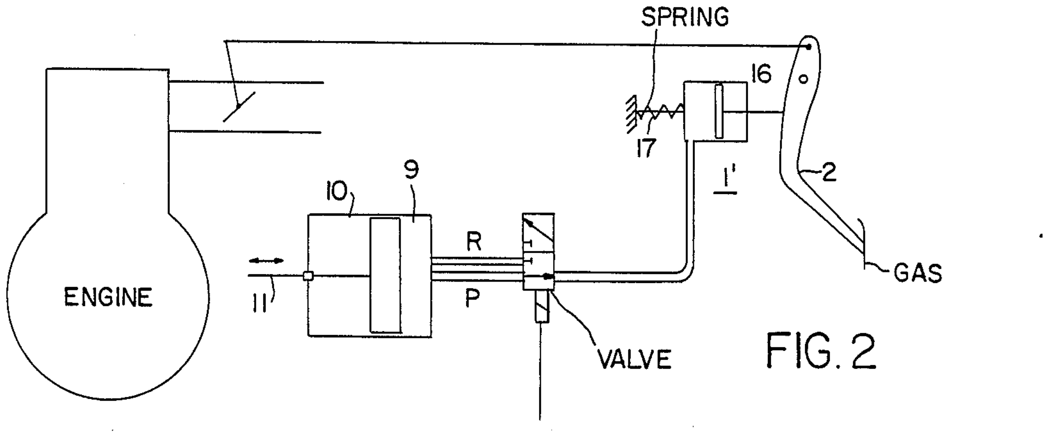
FIG. 2 is a schematic view of a modified embodiment of the installation of FIG. 1.

The installation according to FIG. 2 is modified compared to that of FIG. 1 only in two ways. On the one hand, the abutment 1' now acts on the gas pedal only with the aid of a piston, i.e., the self-returning force is missing. This, however, can be achieved by the control of the actuation for the piston 11 in FIG. 2 toward the left following the reduction of the slippage. On the other hand, the piston 16 is elastically mounted. A kick-down spring 17 serves for this purpose, which exerts on the gas pedal 2 a smaller force than the piston of the cylinder 16. It is possible thereby to override the abutment 1'.

Figure 3:
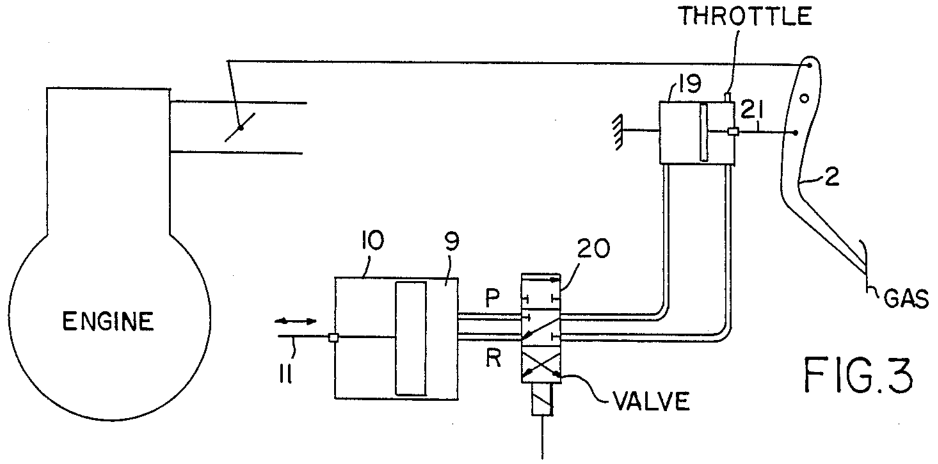
FIG. 3 is a schematic view of a still further modified embodiment of the installation of FIG. 1 which is effective also with an excessive braking moment of the internal combustion engine.

Finally, FIG. 3 illustrates an installation in which a slippage limitation is also assured during coasting operation. A double-acting cylinder 19 force-lockingly connected with the gas pedal 2 serves for this purpose, with the aid of which a defined movement of the gas pedal can be produced both in the sense of an output reduction of the internal combustion engine in case of an excessive driving torque as also in the sense of an output increase in the case of an excessive braking moment. The control of the cylinder 19 takes place with the aid of a valve 20. The actuation of the piston 11 is realized in each case in such a manner that during the occurrence of a non-permissive slippage the piston 11 is acted upon with a force. Depending on the cause of the slippage, this force is transmitted to the one or the other side of the piston 21 in the cylinder 19. If it involves a slippage as a result of an excessive braking moment, then the top side of the piston 21 is acted upon with pressure toward the left in FIG. 3 and the gas pedal 2 and therewith the throttle valve 4 is adjusted in the sense of an output increase of the internal combustion engine (lower position of the valve 20). If, in contrast thereto, it involves a slippage as a result of an excessive driving torque, then the bottom side of the piston 21 is acted upon with pressure toward the right in FIG. 3 and a movement of the gas pedal 2 and of the throttle valve 4 in the opposite sense is undertaken (upper position of the valve 20). If, in contrast, no abnormal slippage exists, the valve 20 is in its center position. The gas pedal 2 and the throttle valve 4 are then freely movable corresponding to the driving desire.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation for limitation of slippage of driven wheels of a driver operated motor vehicle having an internal combustion engine controllable by a directly actuatable output-adjusting means having a gas pedal, comprising adjustble abutment means applying direct force to the output-adjusting means for transmitting via the gas pedal to the driver information concerning the status of driven wheel slippage, said adjustable abutment means being operable to reposition the gas pedal during the occurrence of abnormal slippage from a preselected gas pedal position corresponding to a first engine power output magnitude into a gas pedal position corresponding to a second power output magnitude different from said first magnitude in which the wheels possess substantially predetermined maximum permissive slippage.

2. An installation according to claim 1, wherein the abutment means is hydraulically controlled.

3. An installation according to claim 1, wherein the abutment means is operable to be overridden by means for applying an additional force to the abutment means.

4. An installation according to claim 1, wherein the abutment means is operable to adjust the output-adjusting means in a direction of an output reduction and in the direction of an output increase of the internal combustion engine.

5. An installation according to claim 4, wherein the abutment means is hydraulically controlled.

6. An installation according to claim 4, wherein the abutment means is operable to be overriden by means for applying an additional force to the abutment means.

7. An installation according to claim 6, wherein the abutment means is hydraulically controlled.

* * * * *